United States Patent [19]
Bacon

[11] Patent Number: 5,700,496
[45] Date of Patent: Dec. 23, 1997

[54] SELF-ADJUSTING MOLD BACKPLATE

[76] Inventor: Charles R. Bacon, 5718 N. Shore Dr., Clarklake, Mich. 49234

[21] Appl. No.: 339,556

[22] Filed: Nov. 15, 1994

[51] Int. Cl.⁶ .................................. B28B 21/82; B29C 33/20
[52] U.S. Cl. .......................... 425/193; 425/451.9; 425/541; 425/406; 100/258 A
[58] Field of Search .................................. 425/539, 541, 425/450.1, 451.9, 406; 100/258 A

[56] References Cited

U.S. PATENT DOCUMENTS

| | | | |
|---|---|---|---|
| 3,782,879 | 1/1974 | Mnilk et al. | 425/453 |
| 4,017,239 | 4/1977 | O'Connell et al. | 425/175 |
| 4,648,824 | 3/1987 | Aoki | 425/150 |
| 4,753,160 | 6/1988 | Baird et al. | 425/406 |
| 4,851,176 | 7/1989 | Christiansen et al. | 264/268 |
| 5,059,105 | 10/1991 | Baird | 425/116 |
| 5,259,752 | 11/1993 | Scolamiero et al. | 425/406 |
| 5,411,391 | 5/1995 | Albrecht et al. | 425/541 |
| 5,599,566 | 2/1997 | Casolari | 425/405.1 |

*Primary Examiner*—Thomas R. Weber
*Attorney, Agent, or Firm*—Young & Basile, P.C.

[57] ABSTRACT

A backplate assembly for supporting the molds of blow-molding machines having plural molds wherein the backplate assembly consists of two planar plates having a resilient elastic compressible cushion disposed therebetween to permit limited self-adjustment of the plates as determined by pressure produced upon the mold halves closing. The cushion is formed by an elongated spirally configured elastic resilient strand located within recesses formed in the plates, and the configuration of the strand may be related to the distribution of compressive forces imposed on the backplate assembly.

9 Claims, 2 Drawing Sheets

Dec. 23, 1997 Sheet 1 of 2 5,700,496

SELF-ADJUSTING MOLD BACKPLATE

BACKGROUND OF THE INVENTION

1. Field of the Invention

The invention pertains to backplate assemblies for supporting blowmolding dies upon mold machine platens.

2. Description of the Related Art

In blowmolding machines for blowmolding thermoplastic articles, such as bottles, jugs, and the like, a plurality of molds are normally mounted upon the blowmolding machine head. The molds consist of two parts or halves which, when brought together, define a cavity in which the article forming material is injected, and upon the molding being completed the mold halves are separated for article release.

Because of the high pressures involved in bringing the mold halves together, the mold halves must be very accurately machined and dimensioned. Because a plurality of mold halves are simultaneously engaged and closed, there may be six, eight, twelve, or more, molding stations formed on a single machine, it is critical that all of the associated mold halves simultaneously engage to an equal extent to prevent flashing at the mold half parting line, and to produce a high quality product at each molding station which does not require secondary operations to achieve the desired quality in the product.

In conventional blowmolding multiple station machines wherein each station consists of a pair of mold halves, each mold half is mounted upon a platen by a backplate assembly wherein the platens, and mold halves, may be brought together, or withdrawn from each other during the operation of the apparatus. If the "height" of one of the mold halves is slightly greater than the "height" of a mold half at another station, it is necessary to shim the mold backplates on the platens in order to permit all of the mold halves to simultaneously engage with a substantially equal pressure. Even with shims, it is very difficult to equalize the engaging pressure of the mold halves at each station, and when setting up a blowmolding machine using conventional mold backplates, high skill, and extensive time requirements are necessary to achieve the desired blowmold machine alignment and operation, and it is not uncommon for the apparatus to require re-shimming and realignment during operation.

OBJECTS OF THE INVENTION

It is an object of the invention to provide a backplate assembly for blowmolding apparatus wherein the backplate assembly supporting a mold half is capable of self-adjustment dependent upon the mold half engaging pressures wherein self-adjustment is automatic and permits accommodation of limited dimensional variations at blowmolding stations.

A further object of the invention is to provide a backplate assembly for blowmolding apparatus wherein a resilient elastic cushion is interposed between blowmolding mold support plates, and the cushion permits the supported mold half to automatically accommodate itself to dimensional or angular variations wherein a high quality blowmolded product will be achieved at each molding station of a plural station blowmolding machine.

An additional object of the invention is to provide a backplate assembly for blowmolding machines having multiple molding stations wherein an elastic cushion is interposed between mold part support plates and the cushion is economically formed of an elongated strand of compressible resilient flexible material located within support plate recesses supporting and locating the strand, the configuration of the strand and recesses being of a spiral loop form.

Yet another object of the invention is to provide a backplate assembly for blowmolding machines wherein a pair of mold supporting plates are cushioned with respect to each other by an elongated strand of resilient compressible flexible material formed in a spiral looped configuration and the spacing between adjacent spiral loops may be related to the pressures imposed upon the support plates during molding.

SUMMARY OF THE INVENTION

The invention pertains to a backplate assembly for supporting at least one of the mold halves of a blowmolding mold set wherein a plurality of mold sets are mounted upon a common blowmolding machine head.

A pair of planar support plates mount the mold half upon a molding machine platen by bolts. One of the support plates is bolted to the platen, and the other support plate is bolted to the mold half. The two support plates are also attached together by shouldered bolts in a spaced substantially parallel relationship permitting limited movement therebetween, and a resilient elastic cushion is located between the plates which is pre-loaded by the shouldered bolts interconnecting the plates.

The cushion located between the support plates consists of a serpentine strand of a resilient elastic flexible material such as buna rubber having a circular transverse cross section, and the strand is located over the areas of the support plates which are cushioned in a spiraled configuration defining a plurality of loops one within the other. The spacing between adjacent loops is, preferably, related to the compressive forces which will be imposed upon the backplates during molding, i.e. the elastic strand loops will be closest to each other where the molding pressures are the greatest.

The strand is located and retained between the support plates by complementary recesses formed in each support plate. The recesses define the configuration which the strand assumes, and preferably, the recesses consist of circular segment configurations having a depth into the associated support plate less than half the transverse diametrical dimension of the elastic strand. Accordingly, the strand may be adequately confined within the aligned opposed recesses to retain the strand in the desired configuration and permit the strand material to laterally expand during compression, and yet sufficient spacing exists between the support plates to permit limited movement of the support plates toward each other.

As the spiralled elastic cushion will be compressed as the mold halves close, each mold will automatically accommodate itself to any dimensional mold variations which may occur assuring that the mold half parting lines at each molding station will be fully closed and eliminate flashing during molding, and in the practice of the invention the necessity to shim individual molds is substantially eliminated, and a superior high quality molded article will be assured at each molding head station.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
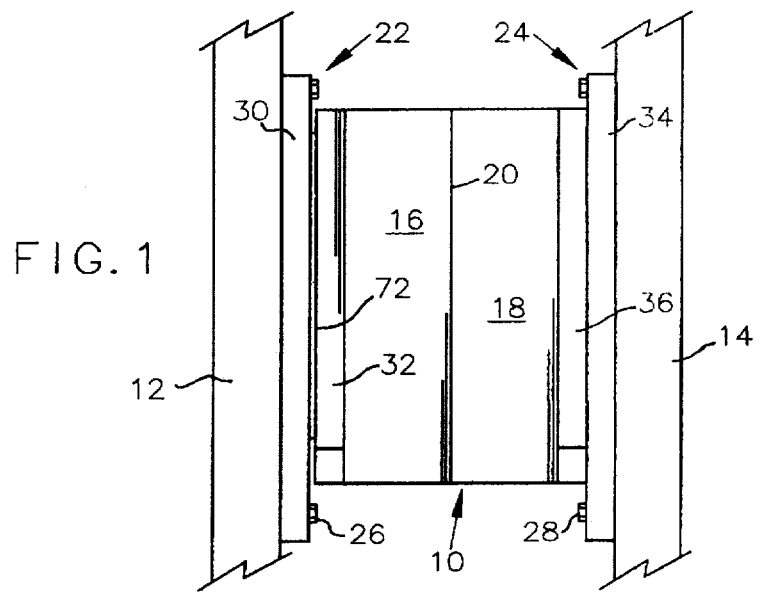
FIG. 1 is a partial elevational view of a blowmolding station illustrating the mold halves in a closed relationship.

With reference to FIG. 1, a typical molding station 10 for a multiple head blowmolding machine is illustrated. The blowmolding machine includes a pair of spaced parallel platens 12 and 14 connected to actuating structure, not shown, which permits the platens to be moved toward and away from each other. A mold or die half 16 is mounted upon the platen 12, while the mold or die half 18 is mounted upon the platen 14. When the die halves 16 and 18 are brought together, a parting line 20 is defined, as is well known. The mold halves 16 and 18 have cavities defined therein, not shown, whereby the configuration of the article to be formed is defined within the mold halves.

A backplate assembly 22 supports the mold half 16 on the platen 12, while a backplate assembly 24 mounts the mold half 18 on the platen 14. Bolts 26 mount the backplate assembly 22 to the platen 12, while bolts 28 attach the backplate assembly 28 to the platen 14.

The backplate assembly 22 is constructed in accord with the invention, and includes a primary support plate 30 and a secondary support plate 32. The backplate assembly 24 constitutes a conventional backplate assembly consisting of the primary support plate 34 directly bolted to the platen 14 and the secondary support plate 36 which is directly bolted against the primary plate 34, and is also bolted to the mold half 18 as is well known.

Figure 2:
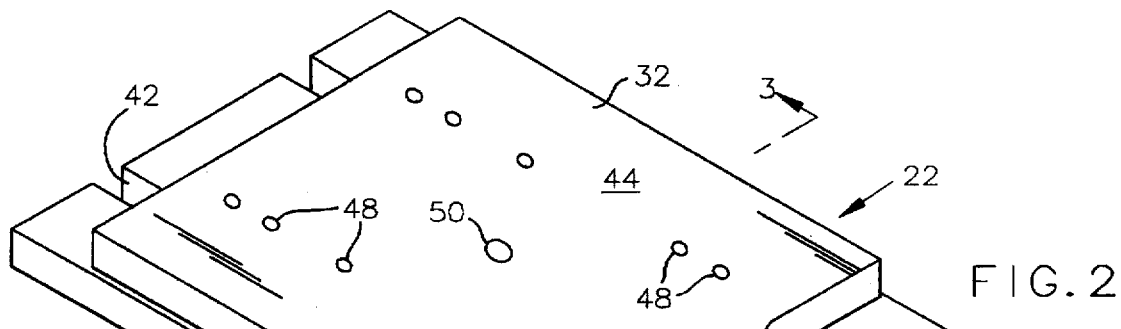
FIG. 2 is a perspective view, partially sectioned, illustrating a mold supporting backplate assembly utilizing the concepts of the invention.

As indicated above, only the backplate assembly 22 is constructed in accord with the inventive concepts, and this backplate assembly is illustrated, per se, in FIG. 2.

The plates 30 and 32 are both of a planar configuration, and are preferably formed of 7075 aluminum. As will be appreciated, these plates are relatively thick and rigid.

The primary support plate 30 includes a flat outer side 38 which is disposed toward the platen 12, and the plate flat inner side 40 is disposed toward the secondary support plate 32. The plate 30 is attached to the platen 12 by the bolts 26 extending through the bolt receiving slots 42 formed in the ends of the plate 30.

The secondary support plate 32 includes a flat inner side 44 which is attached to the mold half 16, and also includes a flat outer side 46 disposed toward the primary plate 30, but spaced therefrom as later described. As will be appreciated from FIG. 2, holes 48 are formed through the secondary plate 32 for internally receiving shoulder bolts permitting the plates 30 and 32 to be interconnected, and holes 50 extending through the backplate 32 permit the secondary plate 32 to be attached to the mold half 16 for the support and mounting thereof. The secondary plate 32 includes a tang 52 at one of its ends.

A resilient elastic cushion is interposed between the primary support plate 30 and the secondary support plate 32 and this resilient cushion is properly located and maintained in the desired location by recesses defined in the support plates. The form and configuration of such recesses are best appreciated from FIGS. 3–6.

Recesses 56 are formed in the inner side 40 of the primary support plate 30. The recesses 56 actually constitute a single configured recess having the configuration shown in FIG. 5. The recess 56 is of a continuous serpentine longitudinal configuration as formed on the inner side 40 in a spiral manner and includes a plurality of loops 58, FIG. 5, one inside the other. One end of the recess 56 is indicated at 60, while the other recess end is indicated at 62. The recess 56 constitutes, in transverse cross section, a partial circular configuration as will be appreciated from FIG. 4, and the recess 56 can be cut into the plate 30 by a computer controlled mill or other type of machine tool.

Figure 6:
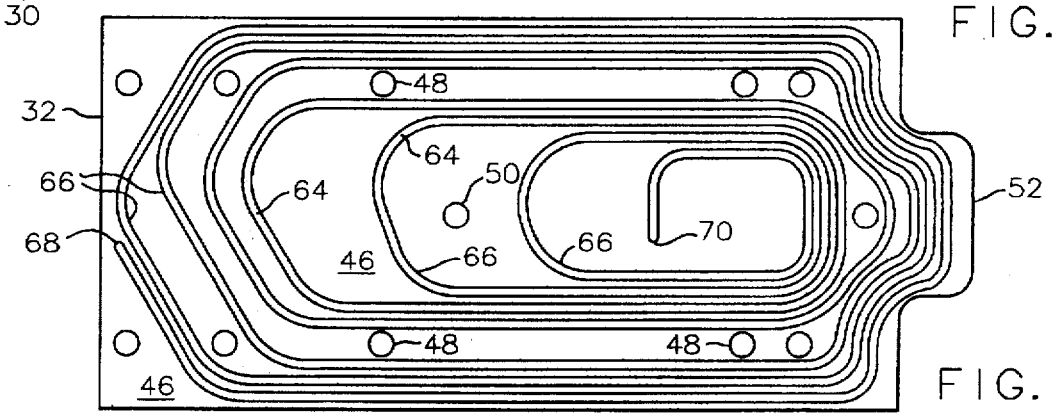
FIG. 6 is a plan view of the secondary support plate used in conjunction with the primary plate shown in FIG. 5 illustrating the cushion receiving recesses defined therein as a mirror image of those of the primary support plate of FIG. 5.

A recess 64 complementary in configuration to the recess 56, and the mirror image thereof as will be appreciated from FIG. 6, is formed in the outer side 46 of the secondary support plate 32. As will be appreciated from FIG. 6, the recess 64 is also formed by a serpentine spiral loop configuration and includes loops 66 complementary to loops 58, and the recess 64 includes the end 68 and the end 70. Likewise, the recess 64 is of a partial circular transverse cross section, FIG. 4.

Figure 3:
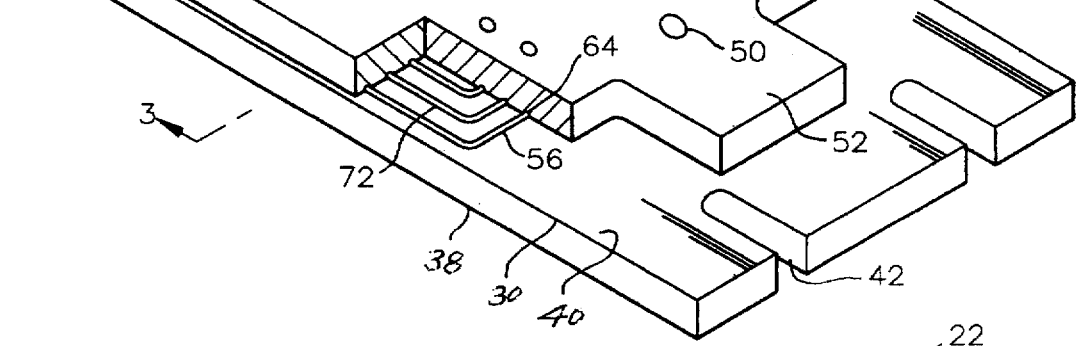
FIG. 3 is an elevational sectional view taken along Section 3—3 of FIG. 2.
Figure 4:
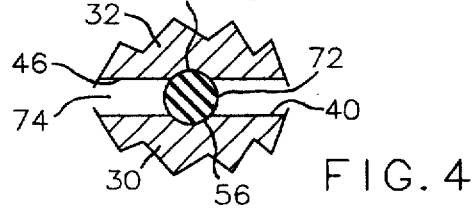
FIG. 4 is an enlarged detail elevational sectional view taken through the elastic strand and support plates illustrating the relationship of the strand to the support plates' recesses.

Cushioning between the plates 30 and 32 is provided by an elongated flexible elastic resilient strand or cord 72 located within the recesses 56 and 64. For instance, the strand 72 may consist of a buna O-ring strand having a durometer of 70. The strand 70 is located within the recesses 56 and 64 throughout their length when the plates 30 and 32 are assembled as shown in FIGS. 2 and 3, and as will be appreciated from FIG. 4, the transverse cross sectional configuration of the strand 72 is circular. The transverse diameter of the strand 72 is greater than the combined depth of the recesses 56 and 64 and the depth of the recesses 56 and 64 is less than the radius of strand 70 whereby a space 74 exists between the plate surfaces 40 and 46, FIG. 4.

The primary backplate assembly 22 is assembled by placing the resilient elastic strand 72 in the recess 56 of the primary support plate 30. The strand 72 will extend from the recess end 60 to the recess end 62, and because of its flexible nature, the strand 72 will lie within the recess 56 throughout its length. The secondary support plate 32 is then placed upon the strand 72 whereby the upper portion of the strand 72 will be fully received within the recess 64 which exactly conforms to the configuration of the recess 56. Thereupon, shouldered bolts may be placed within the shouldered holes 48 defined in plate 30 and these bolts thread into the threaded holes 76, FIG. 5, formed in the primary plate 30 and in this manner, the plates 30 and 32 are assembled. By tightening of the shoulder bolts within holes 48, the plate 32 is drawn toward the plate 30 pre-compressing the elastic strand 72.

The mold half 16 is then mounted upon the secondary support plate 32 through holes 50, and the backplate assembly 22 and mold half 16 can now be mounted upon the platen 12 by the bolts 26 extending through the slots 42.

During molding, the platens 12 and 14 will be moved toward each other until the mold halves 16 and 18 engage at the parting line 20. In that a plurality of die sets are mounted on the blowmolding machine wherein a plurality of molding stations 10 exist, slight inaccuracies of the dimensions of the mold parts 16 and 18 in the direction of movement of the platens 12 and 14 will be accommodated by a compression of the strand 72 between the plates 30 and 32. This compression may only equal several thousandths of an inch, but because of the resilient nature of the material of the strand 72 compression of the strand will cause the strand material to laterally bulge and permit the plates 30 and 32 to move closer to each other, or slight angular tilting between the support plates is possible. In this manner, the use of the resilient elastomeric cushion provided by strand 72 between plates 30 and 32 will permit all of the mold die halves on the head of a molding machine to properly engage, and the time consuming and accurate shimming that was previously required at the various stations 10 is eliminated.

Figure 5:
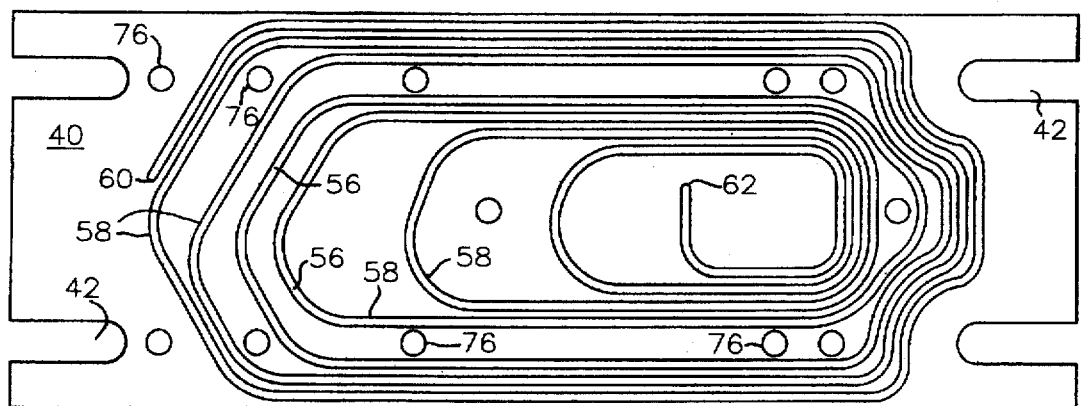
FIG. 5 is a plan view of a primary support plate illustrating the inner side and the cushion receiving recesses defined therein.

As will be appreciated from FIGS. 5 and 6, the spacing between the loops 58 and 66 may vary. The dimension of this spacing between adjacent loops is preferably related to the pressures existing in the die mold halves 16 and 18 in the regions of the loops, and the loops may by further apart where lesser molding pressures are required, and closer together where greater molding pressures exist. The use of the elongated resilient strand 72 permits the cushioning material to be located between the plates 30 and 32 in the most advantageous manner, and to conform to the configuration of the plates and the location of the bolt holes. The strand 72 may be considered to consist of a plurality of interconnected segments, but in actual practice the strand 72 is a single strand which is located over the support plate areas that are to be cushioned.

Figure 7:
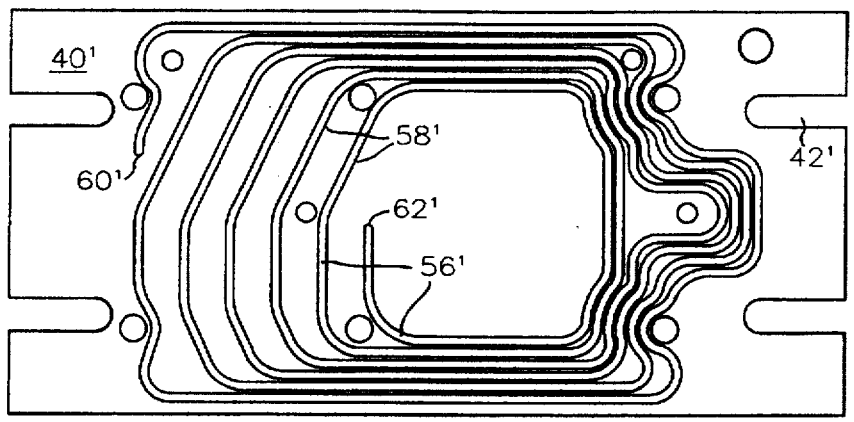
FIG. 7 is a plan view illustration of another primary support plate used with a mold for forming an article of a different configuration than the mold used with the support plates of FIGS. 5 and 6, illustrating the configuration of the cushion recesses.
Figure 8:
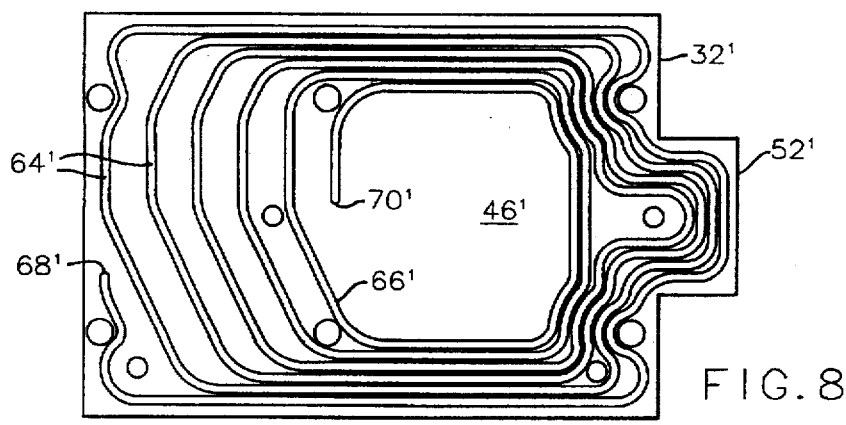
FIG. 8 is a plan view of the secondary support plate used with the primary plate of FIG. 7, illustrating the cushion recesses as defined therein constituting a mirror image of those formed in the primary support plate of FIG. 7.

In FIGS. 7 and 8, a variation of the configuration of the strand receiving recesses are illustrated, and in these figures, components equivalent to those previously described are indicated by primed reference numerals. In the embodiment of FIGS. 7 and 8, a different configuration of strand receiving recesses 56' and 64' are indicated whereby a different size or configured article being molded can be accommodated to the concepts of the invention, and as will be appreciated from FIGS. 7 and 8, the flexibility of the location of the strand 72 permits the principles of the invention to be utilized with a wide variety of support plate configurations.

It is appreciated that various modifications to the inventive concepts may be apparent to those skilled in the art without departing from the spirit and scope of the invention.

I claim:

1. A self-adjusting mold backplate assembly for molding dies adapted to be mounted upon a molding machine platen comprising, in combination, a first plate of planar configuration having an outer surface and a flat inner surface, first mounting means defined on said first plate for attaching said first plate to a mold machine platen with said outer surface disposed toward the machine platen, a second plate of planar configuration having an inner surface and a flat outer surface, second mounting means defined on said first plate for mounting said second plate upon said first plate with said second plate outer surface disposed toward said first plate inner surface and spaced therefrom, third mounting means defined on said second plate for mounting a molding die disposed toward said second plate inner surface, and a resilient elastomeric cushion located between and compressed between said first plate inner surface and said second plate outer surface maintaining the spacing between said first and second plates and permitting limited self-adjustment of the spacing therebetween, said first plate inner surface and said second plate outer surface each having substantially equal spaced opposed cushioned areas, said area of said second plate substantially comprising the entire flat configuration of said second plate, said resilient elastic cushion being located over substantially all of said areas, said cushion comprising a plurality of spaced resilient longitudinal segments spaced over said area.

2. In a self-adjusting mold backplate assembly as in claim 1, first recesses defined in said first plate inner surface throughout said cushioned area thereof, second recesses defined in said second plate outer surface throughout said cushioned area thereof, said first and second recesses being complementarily shaped to oppose each other in an aligned relationship, said resilient cushion longitudinal segments being received within said recesses whereby said recesses locate and position said segments between said first and second plates.

3. In a self-adjusting mold backplate assembly as in claim 2, said first and second recesses each having a continuous serpentine configuration disposed over the associated plate area, said resilient elastic cushion comprising an elongated strand having a transverse cross sectional dimension greater than twice the confined depth of said recesses into the associated plate, said strand assuming the serpentine configuration of said recesses.

4. In a self-adjusting mold backplate assembly as in claim 3, said serpentine configuration of said recesses comprising a plurality of loops about said plates' areas, adjacent loops being spaced from each other a distance proportional to the pressures being applied to said plates during molding transverse to the planar configuration of said plates.

5. A self-adjusting mold backplate assembly for molding dies adapted to be mounted upon a molding machine platen comprising, in combination, a first plate of planar configuration having an outer surface and an inner surface, first mounting means defined on said first plate for attaching said first plate to a mold machine platen with said outer surface disposed toward the machine platen, a second plate of planar configuration having inner and outer surfaces, second mounting means defined on said first plate for mounting said second plate upon said first plate with said second plate outer surface disposed toward said first plate inner surface and spaced therefrom, third mounting means defined on said second plate for mounting a molding die disposed toward said second plate inner surface, said first plate inner surface and said second plate outer surface being flat, a plurality of first elongated recesses defined in said first plate inner surface, a plurality of second elongated recesses defined in said second plate complementary in configuration to said first recesses and in aligned opposed spaced relation thereto, and elongated resilient elastic cushion segments located within said recesses and partially confined thereby, said cushion segments maintaining said first plate inner surface and said second plate outer surface in spaced relationship and permitting limited cushioned movement therebetween.

6. In a self-adjusting mold backplate assembly as in claim 5, said cushion segments having a circular transverse cross section, said recesses having a partial circular cross section, the confined depth of said recesses being less than the diameter of said segments.

7. In a self-adjusting mold backplate assembly as in claim 5, said first and second recesses having a configuration comprising a plurality of loops one within the other, adjacent loops being spaced from each other, said cushion segments being defined by an elongated strand within said loops.

8. In a self-adjusting mold backplate assembly as in claim 7, adjacent loops being spaced from each other a distance proportional to the pressure being applied to said plates during molding transverse to the planar configuration of said plates.

9. In a self-adjusting mold backplate assembly as in claim 8, said recesses being in the form of a spiral defined by coiled loops and said cushion strand comprising a single strand spiralled within said recesses.

* * * * *